US008890652B2

(12) United States Patent
Falk et al.

(10) Patent No.: US 8,890,652 B2
(45) Date of Patent: Nov. 18, 2014

(54) METHOD FOR THE ACCESS CONTROL TO AN AUTOMATION UNIT

(75) Inventors: Rainer Falk, Erding (DE); Florian Kohlmayer, Sarnberg (DE); Andreas Köpf, München (DE)

(73) Assignee: Siemens Aktiengesellschaft, Munich (DE)

( * ) Notice: Subject to any disclaimer, the term of this patent is extended or adjusted under 35 U.S.C. 154(b) by 914 days.

(21) Appl. No.: 12/679,725

(22) PCT Filed: Aug. 28, 2008

(86) PCT No.: PCT/EP2008/061277
§ 371 (c)(1),
(2), (4) Date: Mar. 24, 2010

(87) PCT Pub. No.: WO2009/040206
PCT Pub. Date: Apr. 2, 2009

(65) Prior Publication Data
US 2010/0201480 A1      Aug. 12, 2010

(30) Foreign Application Priority Data

Sep. 25, 2007   (DE) .................. 10 2007 045 772

(51) Int. Cl.
| | | |
|---|---|---|
| *G05B 19/00* | (2006.01) | |
| *G06F 17/30* | (2006.01) | |
| *G05B 15/02* | (2006.01) | |
| *G06F 7/04* | (2006.01) | |
| *G05B 19/042* | (2006.01) | |

(52) U.S. Cl.
CPC .... *G05B 19/042* (2013.01); *G05B 2219/24159* (2013.01)

USPC .......... 340/5.8; 340/4.34; 340/4.36; 707/784; 707/786; 700/9; 726/4

(58) Field of Classification Search
USPC ............................................. 340/5.8
See application file for complete search history.

(56) References Cited

U.S. PATENT DOCUMENTS

| | | | | |
|---|---|---|---|---|
| 6,201,996 | B1 * | 3/2001 | Crater et al. ...................... 700/9 |
| 6,422,463 | B1 * | 7/2002 | Flink ............................. 235/382 |
| 7,895,234 | B2 * | 2/2011 | Lillie et al. .................... 707/784 |
| 2004/0162996 | A1 * | 8/2004 | Wallace et al. ............... 713/201 |
| 2006/0026672 | A1 | 2/2006 | Braun ............................... 726/9 |
| 2007/0022478 | A1 * | 1/2007 | Miyamoto et al. .............. 726/17 |
| 2010/0201480 | A1 | 8/2010 | Falk et al. ...................... 340/5.8 |

FOREIGN PATENT DOCUMENTS

| | | | |
|---|---|---|---|
| EP | 1621944 | 2/2006 | ........... G05B 19/042 |
| WO | 2009/040206 A1 | 4/2009 | ........... G05B 19/042 |

OTHER PUBLICATIONS

International Search Report for Application No. PCT/EP2008/061277 (1 page), Feb. 16, 2009.

(Continued)

*Primary Examiner* — Jennifer Mehmood
*Assistant Examiner* — John Mortell
(74) *Attorney, Agent, or Firm* — King & Spalding L.L.P.

(57) ABSTRACT

In a method for the access control to an automation unit (01), access rights predetermined by the access control are dependant on the operating state of the automation unit (01), wherein at least during an emergency, expanded access rights in relation to normal operation are granted independently of the access rights during normal operation.

27 Claims, 1 Drawing Sheet

(56) References Cited

OTHER PUBLICATIONS

Covington et. al., "Securing Context-Aware Applications Using Environment Roles", proceedings of the sixth ACM symposium on Access Control Models and Technologies, Chantilly, Virginia, United States, 2001, ISBN: 1-58113-350-2 (16 pages), Nov. 17, 2000.

Chinese Search Report, Application No. 200880108586.6, 2 pages, Nov. 26, 2012.

\* cited by examiner

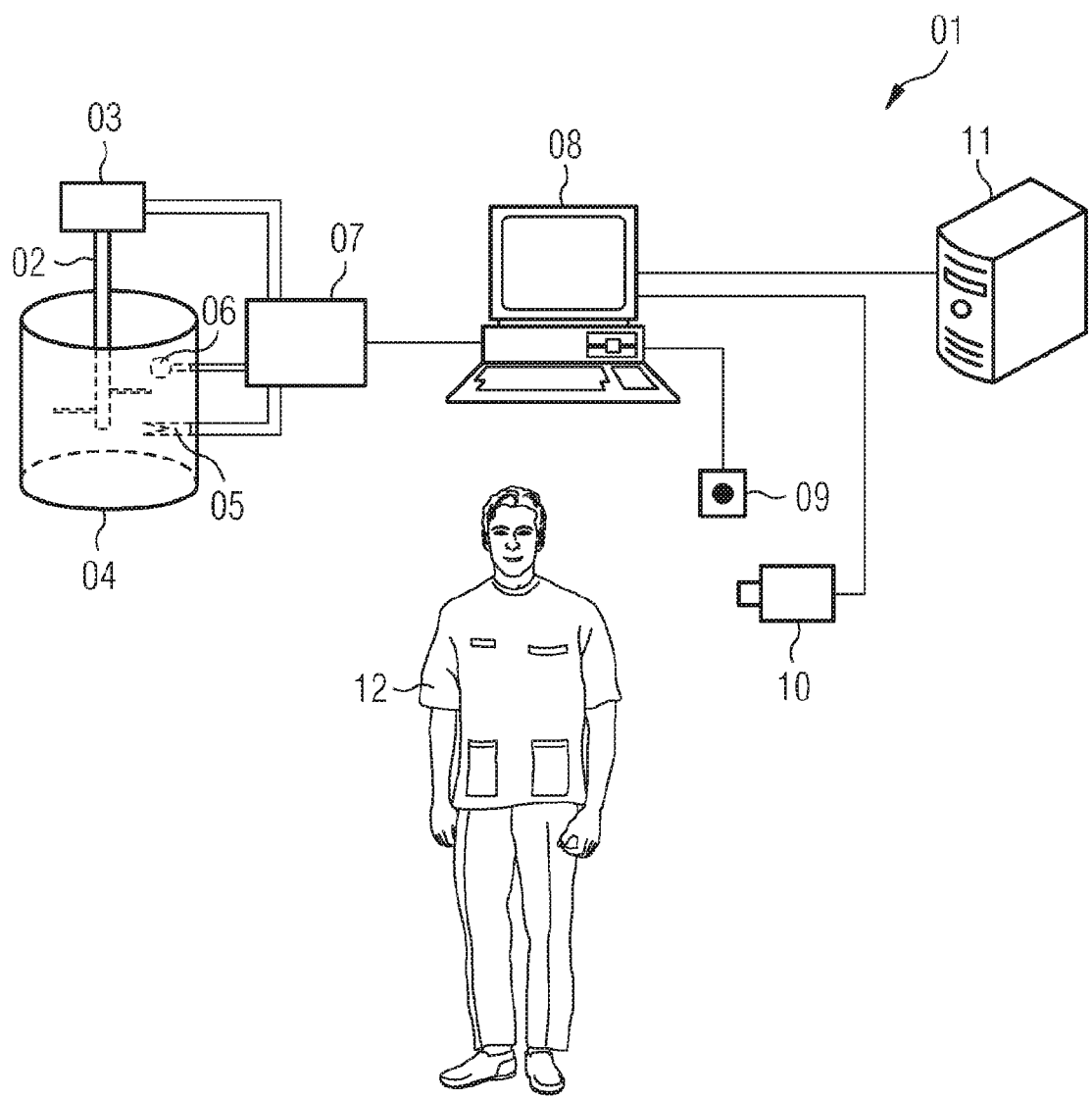

METHOD FOR THE ACCESS CONTROL TO AN AUTOMATION UNIT

CROSS-REFERENCE TO RELATED APPLICATIONS

This application is a U.S. National Stage Application of International Application No. PCT/EP2008/061277 filed Aug. 28, 2008, which designates the United States of America, and claims priority to German Application No. 10 2007 045 772.5 filed Sep. 25, 2007, the contents of which are hereby incorporated by reference in their entirety.

TECHNICAL FIELD

The invention relates to a method for access control on an automation plant.

BACKGROUND

The introduction of information technology (IT) into automation and the increasing integration with office environments, also increases the need for security solutions for automation environments. At the same time, access control is an essential security functionality which establishes and dictates which operations a person can carry out. For example it can specify what access can be implemented by operating personnel for operating and monitoring a procedure or a production method or an industrial or manufacturing process.

The three main pillars of IT security are confidentiality, integrity and availability. In relation to typical office environments, confidentiality and integrity of data are usually the primary roles. In the automation environment, however, the availability is more important than the confidentiality of the data. Usually in this connection it is mainly control and status commands and rarely highly-secret data that are transmitted over the network.

Because of the operating environment, special local restrictions have to be taken into consideration. So, in an industrial process automation environment of a manufacturing process in the processing industry for example, in the event of a safety emergency in the plant control, a physical process such as the heating and stirring of an adhesive cannot easily be halted. Likewise, conversely in an emergency, for example overheating of the adhesive, intervention by operating personnel by means of IT security measures must not be prevented. In such an emergency, strict access rights which are desirable from the point of view of IT security must not prevent the required manual interventions or make them unnecessarily difficult.

Role based access control (RBAC) is known. In practice this often merely means role-based administration of access rights. In this case, groups are defined according to the existing tasks. Access rights are assigned to individual groups. Individual personnel are assigned to the groups corresponding to their tasks and consequently receive the access rights required for their task.

From a theoretical standpoint, RBAC means that an individual employee carries out different tasks at different times and correspondingly performs different roles at different times. If the employee's tasks change over a number of time intervals, in each case he implements a role change in order to obtain the access rights assigned to the respective currently performed role.

Moreover, context-based access control in the care and supervision of elderly persons in the home, in which access rights are also dependent on context information—also termed environment information—is known from Covington et al "Securing context-aware applications using environment roles", Proceedings of the sixth ACM symposium on access control models and technologies, Chantilly, Va., United States, pp 10-20, 2001, ISBN: 1-58113-350-2. This context information relates to the time of day, the day of the week, the place of residence or the current status of a sequence of operations. The access rights are assigned to specific environment roles. Different environment roles can be initiated by context information. Activation of an environment role can automatically initiate an action. For example, an emergency call can be set up automatically when the "injured" environment role is activated.

SUMMARY

According to various embodiments, an access control can be provided that is better adapted to an automation environment.

According to an embodiment, in a method for access control on an automation plant access rights are predetermined by the access control dependent on the operating state of the automation plant, wherein it is possible, at least during an emergency, for extended rights to be granted independently of the access rights in normal operation.

According to a further embodiment, in order to detect the operating state, the automation plant can be monitored. According to a further embodiment, the monitoring can be achieved automatically by means of suitable sensors. According to a further embodiment, the monitoring can be carried out by operating and maintenance personnel. According to a further embodiment, an emergency may be automatically triggered as soon as specific process variables of the automation plant exceed preset limiting values. According to a further embodiment, an emergency may be triggered manually. According to a further embodiment, the access rights in the normal mode may be tightly specified in order to prevent maloperation and unauthorized access. According to a further embodiment, in normal operation the access rights can be specified as role-based. According to a further embodiment, in normal operation, in order to obtain access rights and/or to obtain additional and/or other access rights, identification of the accessing party or authentication can be carried out. According to a further embodiment, when an emergency occurs an alarm can be triggered for automatic signaling and activation of emergency measures. According to a further embodiment, at least in an emergency the actions taken and access effected by operating and maintenance personnel may be recorded and/or logged. According to a further embodiment, at least in an emergency a special emergency safety mode may be provided in which the firm or tight control and allocation of access rights provided for normal operation is replaced by softer measures which can be or are evaluated later. According to a further embodiment, the softer measures may include the granting of extended access rights and/or deactivation of the control and allocation of access rights, which permits all operations and access attempts. According to a further embodiment, the softer measures may include dispensing with an authentication, whereby anyone can use an operator control and monitoring unit that is controlling the automation plant. According to a further embodiment, recording and logging of the access attempts may be implemented for later evaluation of the softer measures. According to a further embodiment, video monitoring or video recording may be activated for later evaluation of the softer measures. According to a further embodiment, the emergency safety mode may include a plurality of sublevels with different access rights, which can be or are incrementally activated. According to a further embodiment, activation of the emergency safety mode may be effected manually. According to a further embodiment, activation of the emergency safety mode may be implemented by actuation of a special switch on a graphical operator interface. According to a further embodiment, activation of the emergency safety mode can be implemented by actuation of a physical safety switch. According to a further embodiment, the physical switch may be coupled to a fire or alarm button. According to a further embodiment, activation of the emergency safety mode can be implemented by a special log-in procedure. According to a further embodiment, activation of the emergency safety mode may be automatically implemented dependent on the operating state of the automation plant. According to a further embodiment, after activation, the emergency safety mode may remain in force until it is again manually deactivated. According to a further embodiment, after activation, the emergency safety mode may be again automatically deactivated on expiration of a certain preset time interval. According to a further embodiment, after activation, the emergency safety mode may be automatically deactivated after an emergency has been averted. According to a further embodiment, the emergency safety mode may remain activated only for as long as a corresponding actuating switch is actuated.

BRIEF DESCRIPTION OF THE DRAWINGS

The invention is explained in detail below with the aid of exemplifying embodiments illustrated in the drawing, where:

FIG. 1 shows a schematic representation of an automation plant.

DETAILED DESCRIPTION

An method for access control on an automation plant according to various embodiments intends that the access rights specified by the access control are dependent on the operating state of the automation plant, it being possible, at least in an emergency, and independently of access rights in normal operation, for extended access rights to be granted as in normal operation.

Granting emergency access with extended access rights, at least in emergencies, allows rapid and flexible operation that is not impeded or made unnecessarily difficult by IT security measures.

In comparison with the prior art, the advantages of the various embodiments are, in particular, that for the regular operational running of the automation plant, access rights can be restricted according to the requirements of regular operation. Appropriately extended access rights are granted for special operating states, especially in an emergency.

In principle, roles are defined which correspond to the different operating states of an automation plant. There is no optional role change as in the case of RBAC, rather the access rights depend on the operating state. A high degree of security is achieved in normal operation and access rights can be made restrictive, since the necessary extended access rights are then only granted in a particular operating state such as during maintenance operations or in an emergency, for example. This can also be considered as a type of override functionality in which, under certain circumstances, the control of the access rights can be canceled.

Moreover, the management of the access rights is simplified since only the access rights for normal operation have to be precisely and strictly specified. In exceptional situations, extended access rights are granted on the assumption that qualified and trustworthy operating and maintenance personnel do not misuse access rights under such circumstances. This trust is based on the fact that the operating and maintenance personnel are highly responsible anyway, since maintenance tasks have to be undertaken which are not automated or not fully automated, such as tool changes, calibration or controlled shutdown of an industrial process, for example.

A further embodiment intends that, the automation plant be monitored in order to record the operating state. Monitoring can be achieved automatically by means of suitable sensors or carried out by operating and maintenance personnel.

Preferably, an emergency is automatically triggered as soon as specific process variables of the automation plant exceed preset limiting values. Likewise, it is conceivable that an emergency is triggered manually by the operating and supervisory personnel.

A further embodiment intends that the access rights are strictly specified in normal operation in order to prevent maloperation and unauthorized access.

Another embodiment intends that in normal operation the access rights are specified as role-based.

A further embodiment intends that in normal operation, in order to obtain access rights and/or to obtain additional and/or other access rights, identification of the accessing party or authentication is carried out by means of a log-in procedure for example. The log-in procedure can take any form, for example by inputting a user name and/or password, by means of an authentication token, such as a chip card for instance or wirelessly, or via a fingerprint or other biometric identification.

An additional embodiment intends that, when an emergency occurs, an alarm is triggered for automatic signaling and activation of emergency measures, so that duty personnel can confirm the emergency.

A further embodiment intends that, at least during an emergency or in an operating state in which extended access rights are granted, the actions taken and access effected by operating and maintenance personnel are recorded by a video camera and/or and are logged on a logging server for example. Access rights can thus be overwritten as and when required or on request so to speak. However, this is recorded both by recording and logging the access incidents as well as by activating video monitoring, and it can therefore be verified whether the reason for this happening was in fact legitimate.

A further embodiment intends that, at least in an emergency, a special emergency safety mode is provided in which the firm or tight control and allocation of access rights provided for normal operation is replaced by softer measures which, however, can be or are evaluated later. The replacement of firm safety measures in force in normal operation by soft safety measures in an emergency makes it possible for all necessary measures to be carried out by the operating and supervisory personnel. Nevertheless, misuse is prevented since the fact of the triggered emergency, as well as the actions taken and the resulting access can be subsequently reconstructed.

The softer measures preferably include granting of extended access rights and/or if necessary deactivation of the controls and allocation of access rights, whereby all operations and access are permitted.

Alternately, it is conceivable that the softer measures include dispensing with authentication, by log-in for example, whereby anybody can use an operator control and monitoring unit that is controlling the automation plant. Recording and logging of the effected access is preferably carried out for subsequent evaluation of the softer measures. This can be carried out on the operator control and monitoring unit itself or on a logging server specially provided for this and housed in a hazard-proof, for example fireproof and/or explosion-proof room.

For later evaluation of the softer measures, a video monitor or a video recording can be activated in order to determine with the aid of the video material who has initiated the emergency safety mode and who has effected which access and carried out which actions.

The emergency safety mode preferably includes a plurality of sublevels with different access rights which can be activated or are activated incrementally. Since possibly slightly higher access rights suffice as virtual first aid to avert the worst in an emergency, the emergency safety mode preferably includes a plurality of sublevels. These can be activated incrementally. In a first emergency activation step, for example, only the most necessary of the rights are granted in order to delay an imminent emergency for example, and initiate simple countermeasures. If continuing measures are necessary to prevent the emergency, then a second emergency activation step must also be activated, which grants continuing, unrestricted access for example. In this case it is conceivable, for example, that permanent configuration changes can also be implemented. The activation of a second emergency activation step such as this can then be protected in a more sophisticated manner than that of the first emergency activation step. It is therefore conceivable for example, that the first emergency activation step can be activated by mouse click at the user interface of the operator control and monitoring unit, and the second emergency activation step only via a physical safety switch which can be operated only after smashing a safety glass, for example.

Activation of the emergency safety mode can be achieved manually for example by actuation of a special switch on a graphical operator interface. Here, so that activation of the emergency safety mode does not occur for reasons of convenience during the regular operating mode, a special switch is provided on a graphical operator interface, the actuation of which causes a manual changeover to the emergency safety mode. At the same time, the manual changeover to the emergency safety mode can be accessible to all personnel or only to specially authorized personnel, for example only to the foreman or foremen.

Alternately, manual activation of the emergency safety mode can be achieved by actuation of a physical safety switch. Such a physical safety switch can be a key-operated switch, for example, or a break-glass pushbutton as is known in fire alarms, for example, or two spatially separated switches which have to be actuated by at least two persons, preferably simultaneously. In the latter case, both switches can be located on the automation plant but at such a distance that they cannot be actuated simultaneously by one person alone. The two switches can also be spatially separated from each other in such a way that one switch is located on the automation plant itself and the second switch in a remote safety control center.

The physical switches can be coupled to a fire or alarm button which on actuation additionally results in an alarm signal to a works fire service, for example.

Furthermore, it is conceivable that manual activation of the emergency safety mode is achieved by means of a special log-in procedure, for example an input of a special emergency password or use of a special emergency authentication token such as an emergency chip card, for instance.

Activation of the emergency safety mode is preferably realized automatically and dependent on the operating state of the automation plant. For this, specific parameters of the automation plant are monitored and by comparison with preset limiting values for these parameters, for example, a decision is automatically made as to whether a normal operating state or an emergency exists. In industrial process automation plants, pressure and temperature can be measured for example by a suitable, preferably redundant arrangement of sensors, it being possible by comparison with specified limiting values, to automatically monitor, for instance: maximum permissible temperature, maximum permissible pressure, minimum temperature, minimum pressure, and establish whether the measured values for pressure and temperature in the automation plant when a specific industrial process is running, lie within a specified permissible operating range, that is to say a normal operating state exists, or if not, an emergency exists. Alternately, the rotational speed of a motor can also be monitored and compared to specified setpoint values.

Following activation, the emergency safety mode can remain until it is again manually deactivated by actuating a switch or such like, for example.

Alternately, it is conceivable that following activation, the emergency safety mode is again automatically deactivated on expiration of a certain preset time interval.

Likewise, following activation, the emergency safety mode can be automatically deactivated after an emergency has been averted, for example if the measured values detected by sensors again lie within a permissible operating range. Moreover it is conceivable that the emergency safety mode remains activated only for as long as a corresponding actuating switch or such like is actuated or is kept actuated.

An automation plant 01 illustrated In FIG. 1 contains a stirrer 02 that is driven by a motor 03. The stirrer 02 stirs a substance in a tank 04. A heater 05 and a temperature sensor 06, both of which are connected to a process computer 07, are located in the tank 04. Pipelines for transporting the substance in and out of the tank 04 are not shown. The process computer 07 is connected to an operator control and monitoring unit 08. The operator control and monitoring unit 08 is linked to an emergency switch 09, a video camera 10, and a logging server 11. The operating and maintenance personnel 12 monitors and controls the industrial stirring process of the substance in the tank 04 via the operator control and monitoring unit 08. In the event of an incident or emergency, the operating and maintenance personnel 12 actuates the emergency switch 09, whereupon the operating and maintenance personnel 12 receives unrestricted access rights and thus unrestricted access. At the same time, however, the actions taken and access effected by the operating and maintenance personnel 12 are recorded by the video camera 10 and logged on the logging server 11.

According to the various embodiments, for the regular operation of an automation plant with an operator control and monitoring unit, tight access control is implemented, where the operating personnel has to authenticate himself, for example by logging in, and can get access to the operator control and monitoring unit, which in addition is permitted by a defined access control policy. Here the objective is not so much about achieving confidentiality of the transmitted data, but rather more about preventing maloperation and unauthorized access. The log-in procedure can take any form, for example by inputting a user name and/or password, by means of an authentication token such as a chip card, for instance, or wirelessly, or via a fingerprint or other biometric identification.

In order to react appropriately to emergencies which naturally can include unforeseen aspects, extended access rights are required in these cases. According to the various embodiments, extended access rights are granted in emergencies.

This facilitates rapid and flexible action which is not impeded or made unnecessarily difficult by IT security measures. Moreover, a special emergency safety mode/special emergency safety configuration is provided.

In this case, the access control provided for normal or regular operation is replaced by softer measures which can, however, be evaluated later:

- granting of extended access rights and/or if necessary deactivation of access control, whereby all access is allowed;
- replacing authentication by log-in, for example, whereby anyone can use the operator control and monitoring unit;
- recording and logging the access attempts, so-called logging. This can be carried out on the operator control and monitoring unit itself or on a logging server that is specially provided for this and housed in a hazard-proof, for example fire-proof and/or explosion-proof room.
- activating a video monitor or video recording in order to establish by means of the recorded video material which person or persons initiated the emergency safety mode, effected access and carried out which actions.
- triggering an alarm by which duty personnel can confirm the emergency.

Replacement of firm safety measures that are valid in normal operation by soft safety measures in an emergency makes it possible for all necessary measures to be implemented by the operating and supervisory personnel. Nevertheless, maloperation is prevented since the facts of the triggering of the emergency as well as the actions taken and the access effected, can be reconstructed later.

Access rights can thus be overwritten as and when required or on request so to speak. However, this is recorded both by recording and logging the access incidents as well as by activating video monitoring, and it can therefore be verified whether the reason for this happening was in fact legitimate.

Since possibly slightly higher access rights suffice as virtual first aid to avert the worst in an emergency, the emergency safety mode can preferably include a plurality of sublevels. These can be activated incrementally. In a first emergency activation step, for example, only the most necessary of the rights are granted in order to delay an imminent emergency, for example, and initiate simple countermeasures. If continuing measures are necessary to prevent the emergency, then a second emergency activation step must also be activated, which grants continuing, unrestricted access, for example. In this case it is conceivable, for example, that permanent configuration changes can also be implemented. The activation of a second emergency activation step such as this can then be protected in a more sophisticated manner than that of the first emergency activation step. It is therefore conceivable, for example, that the first emergency activation step can be activated by mouse click at the user interface of the operator control and monitoring unit, and the second emergency activation step only via a physical safety switch which can be operated only after smashing a safety glass, for example.

The change to the emergency safety mode can be realized in different ways. At the same time it is important that the special significance of this is clear and therefore activation for reasons of convenience does not occur in the regular operating mode.

A first variant which ensures that activation of the emergency safety mode for reasons of convenience does not occur in the regular operating mode, can be realized for example by means of a special switch on a graphical operator interface, the actuation of which results in changeover to the emergency safety mode. At the same time, the manual changeover to the emergency safety mode can be accessible to all personnel, or only to certain authorized personnel, for example the foreman or foremen.

A second variant which ensures that activation of the emergency safety mode for reasons of convenience does not occur in the regular operating mode, is the use of a physical safety switch for activating the emergency safety mode. Such a physical safety switch can be a key-operated switch, for example, or a break-glass pushbutton as is known in fire alarms, for example, or two spatially separated switches which have to be actuated by at least two persons, preferably simultaneously. In the latter case, both switches can be located on the automation plant but at such a distance that they cannot be actuated simultaneously by one person alone. The two switches can also be spatially separated from each other in such a way that one switch is located on the automation plant itself and the second switch in a remote safety control center. The physical safety switches as described can be linked to a typical fire or alarm button which on actuation additionally results in an alarm signal to a works fire service, for example.

A third variant which ensures that activation of the emergency safety mode for reasons of convenience does not occur in the regular operating mode, provides for a special log-in procedure, for example the inputting of a special emergency password or use of a special emergency authentication token such as an emergency chip card, for instance.

A fourth variant which ensures that activation of the emergency safety mode for reasons of convenience does not occur in the regular operating mode, automatically depends on the operating state of the automation plant. For this, specific parameters of the automation plant are monitored and by comparison with preset limiting values for these parameters, for example, a decision is automatically made as to whether a normal operating state or an emergency exists. In industrial process automation plants, pressure and temperature can be measured for example by a suitable, preferably redundant arrangement of sensors, it being possible, by comparison with specified limiting values to automatically monitor, for instance: maximum permissible temperature, maximum permissible pressure, minimum temperature, minimum pressure, and to establish whether the measured values for pressure and temperature in the automation plant when a specific industrial process is running, lie within a specified permissible operating range, that is to say a normal operating state exists, or if not, an emergency exists.

Following activation, the emergency safety mode can either remain until it is manually deactivated again by actuating a switch or such like, for example, or it is again automatically deactivated on expiration of a certain preset time interval. The emergency safety mode can also be automatically deactivated after an emergency has been averted, for example if the measured values detected by sensors again lie within a permissible operating range.

As a further possibility it is conceivable that the emergency safety mode remains activated only for as long as a corresponding actuating switch or such like is actuated or is kept actuated.

What is claimed is:

1. A method for access control for a process on an automation plant comprising:
   - by a computer, predetermining access rights by the access control dependent on the operating state of the process of the automation plant,
   - determination of an emergency related to the an automation plant, and by the computer, at least during the emergency, granting extended rights for access control of the process independently of the access rights in a normal operation of control of the process;

wherein the determination of the emergency triggers an emergency safety mode in which firm or tight control and allocation of access rights provided for normal operation is replaced by softer measures which can be or are evaluated later; and wherein the emergency safety mode includes a plurality of emergency safety mode sublevels that are activated incrementally and that, once actuated, provide different degrees of access rights for control of the process, wherein a first emergency safety mode sublevel is activated by a first emergency activation step and provides a first degree of access rights for control of the process, and a second emergency safety mode sublevel is activated by a second emergency activation step in combination with the first emergency activation step and provides a second degree of access rights for control of the process that is greater than the first degree of access rights.

2. The method according to claim 1, wherein in order to detect the operating state, the automation plant is monitored.

3. The method according to claim 2, wherein the monitoring is achieved automatically by means of suitable sensors.

4. The method according to claim 2, wherein the monitoring is carried out by operating and maintenance personnel.

5. The method according to claim 1, wherein an emergency is automatically triggered as soon as specific process variables of the automation plant exceed preset limiting values.

6. The method according to claim 1, wherein an emergency is triggered manually.

7. The method according to claim 1, wherein the access rights in normal operation are tightly specified in order to prevent maloperation and unauthorized access.

8. The method according to claim 1, wherein in normal operation, in order to at least one of obtain access rights and to obtain at least one of additional and other access rights, identification of the accessing party or authentication is carried out.

9. The method according to claim 1, wherein when an emergency occurs an alarm is triggered for automatic signaling and activation of emergency measures.

10. The method according to claim 1, wherein at least in an emergency the actions taken and access effected by operating and maintenance personnel are at least one of recorded and logged.

11. The method according to claim 1, wherein the softer measures include at least one of the granting of extended access rights and deactivation of the control and allocation of access rights, which permits all operations and access attempts.

12. The method according to claim 1, wherein the softer measures include dispensing with an authentication, wherein anyone can use an operator control and monitoring unit that is controlling the automation plant.

13. The method according to claim 1, wherein recording and logging of the access attempts is implemented for later evaluation of the softer measures.

14. The method according to claim 1, wherein video monitoring or video recording is activated for later evaluation of the softer measures.

15. The method according to claim 1, wherein activation of the emergency safety mode is effected manually.

16. The method according to claim 15, wherein activation of the emergency safety mode is implemented by actuation of a special switch on a graphical operator interface.

17. The method according to claim 15, wherein activation of the emergency safety mode is implemented by actuation of a physical safety switch.

18. The method according to claim 17, wherein the physical switch is coupled to a fire or alarm button.

19. The method according to claim 15, wherein activation of the emergency safety mode is implemented by a special log-in procedure.

20. The method according to claim 1, wherein activation of the emergency safety mode is automatically implemented dependent on the operating state of the automation plant.

21. The method according to claim 1, wherein after activation, the emergency safety mode remains in force until it is again manually deactivated.

22. The method according to claim 1, wherein after activation, the emergency safety mode is again automatically deactivated on expiration of a certain preset time interval.

23. The method according to claim 1, wherein after activation, the emergency safety mode is automatically deactivated after an emergency has been averted.

24. The method according to claim 1, wherein the emergency safety mode remains activated only for as long as a corresponding actuating switch is actuated.

25. The method according to claim 1, wherein both the first emergency activation step for activating the first emergency safety mode and the second emergency activation step for activating the second emergency safety mode are performed locally at the automation plant.

26. The method according to claim 1, wherein video monitoring or video recording is automatically activated in response to determination of the emergency.

27. The method according to claim 1, wherein the second emergency safety mode sublevel can be activated only after activation of the first emergency safety mode.

* * * * *

UNITED STATES PATENT AND TRADEMARK OFFICE
CERTIFICATE OF CORRECTION

PATENT NO.      : 8,890,652 B2
APPLICATION NO. : 12/679725
DATED           : November 18, 2014
INVENTOR(S)     : Rainer Falk et al.

It is certified that error appears in the above-identified patent and that said Letters Patent is hereby corrected as shown below:

On the Title Page

Item (75) Inventors, 2$^{nd}$ Inventor "Florian Kohlmayer, Sarnberg, (DE)" should read -- Florian Kohlmayer, Starnberg, (DE) --.

Signed and Sealed this
Tenth Day of March, 2015

Michelle K. Lee
*Deputy Director of the United States Patent and Trademark Office*